United States Patent [19]

Grosser et al.

[11] Patent Number: 4,677,567

[45] Date of Patent: Jun. 30, 1987

[54] FUEL BLENDING PROCESS

[75] Inventors: Richard W. Grosser, Hopewell; Jay E. Jensen, Raritan, both of N.J.

[73] Assignee: Mobil Oil Corporation, New York, N.Y.

[21] Appl. No.: 684,899

[22] Filed: Dec. 21, 1984

[51] Int. Cl.[4] .............................................. G06F 15/46
[52] U.S. Cl. .................................... 364/502; 364/550; 137/4; 137/92; 374/23
[58] Field of Search ....................... 364/502, 551, 552; 73/54, 59, 60; 374/22, 23; 137/92, 4

[56] References Cited

U.S. PATENT DOCUMENTS

| | | |
|---|---|---|
| 2,707,391 | 5/1955 | McSkimin . |
| 3,060,318 | 10/1962 | Ouvrard . |
| 3,457,772 | 7/1969 | Chassagne et al. . |
| 3,527,082 | 9/1970 | Pruvot et al. . |
| 3,549,514 | 12/1970 | Brown et al. ........................ 364/502 |
| 3,643,492 | 2/1972 | Simpson ................................ 374/23 |
| 3,734,629 | 5/1973 | Griffiths et al. . |
| 3,736,431 | 5/1973 | Childs . |
| 3,818,614 | 6/1974 | Meurer . |
| 3,826,904 | 7/1974 | Leonard et al. ..................... 364/502 |
| 3,885,418 | 5/1975 | Kriebel . |
| 3,892,485 | 7/1975 | Merritt et al. . |
| 3,962,041 | 6/1976 | Müller et al. . |
| 3,986,385 | 10/1976 | Johnston et al. ...................... 374/23 |
| 4,003,661 | 1/1977 | Yamano . |
| 4,077,251 | 3/1978 | Winter . |
| 4,077,252 | 3/1978 | Stutz et al. . |
| 4,144,745 | 3/1979 | Sivill . |
| 4,157,036 | 6/1979 | Kivenson . |
| 4,181,177 | 1/1980 | Compton ............................... 137/4 |
| 4,214,475 | 7/1980 | Carter et al. . |
| 4,236,826 | 12/1980 | Yamanishi . |
| 4,241,601 | 12/1980 | Pennington, Sr. et al. .......... 374/23 |
| 4,299,119 | 11/1981 | Fitzgerald et al. . |
| 4,334,424 | 6/1982 | Kepes . |
| 4,347,734 | 9/1982 | Heinz . |
| 4,352,983 | 10/1982 | Silvus, Jr. et al. . |
| 4,544,489 | 10/1985 | Campbell et al. ..................... 137/92 |

Primary Examiner—Parshotam S. Lall
Attorney, Agent, or Firm—Alexander J. McKillop; Michael G. Gilman; Dennis P. Santini

[57] ABSTRACT

Process and apparatus are provided for blending a fuel which includes a No. 2 fuel oil component and a No. 1 fuel oil component, with the No. 1 fuel oil component being added to provide a fuel mixture which will not freeze or form solid wax particles above a predetermined temperature. The process includes lowering a temperature of a sample of the No. 2 fuel oil component, detecting a change in wax crystal concentration of the No. 2 fuel oil component sample by detecting a predetermined rate of change in viscosity of the sample or by detecting a predetermined viscosity level of the sample as the temperature thereof is lowered, and measuring a temperature of the No. 2 fuel oil component or bath in which it is cooled, when the change in wax crystal concentration is detected. A percentage amount of the No. 1 fuel oil component to be mixed with the No. 2 fuel oil component is determined based on the temperature measured as above and on stored data representing respective amounts of the fuels to be mixed to obtain a blend which will not freeze or form solid wax particles above respective fluidity control temperatures. A signal representing this percentage amount is fed to a blending unit which automatically blends the No. 1 and No. 2 fuel oil components in accordance with this determined percentage amount.

30 Claims, 4 Drawing Figures

FUEL BLENDING PROCESS

BACKGROUND OF THE INVENTION

1. Field of the Invention

The present invention relates to fuel blending processes and apparatus, and more particularly, to a fuel blending process and apparatus for obtaining a fuel mixture which will not freeze or form solid particles, e.g., wax particles, above a predetermined temperature.

2. Discussion of the Prior Art

During the winter months in northern states, diesel fuel is normally cut back by adding No. 1 fuel oil, kerosine or No. 1 heating oil to No. 2 fuel oil or heating oil to reduce problems, such as plugged fuel filters, supply lines and screens, associated with wax crystallization from the diesel fuel blend at low temperatures. In general, an assumed fluidity point, cloud point or wax appearance point provides the basis for winter blending as the predictor of low temperature operability limits of diesel equipment. In other words, the temperature at which wax crystals or other solid materials form in the diesel fuel is attempted to be determined in order to ascertain the percentage of No. 1 fuel which must be added to meet the diesel fuel fluidity control temperatures during colder months. In general, as used herein, fluidity refers to fuel in a liquid state without interfering solid or semi-solid, e.g., viscous, particles. Heretofore, diesel fuel blending processes have been based on assumed, arbitrary assumptions regarding the fluidity levels of the No. 2 heating oil component of the ultimate diesel fuel mixture. This occurs when, e.g., a diesel fuel retail distributor buys No. 2 fuel oil from many different suppliers and refineries which supply No. 2 heating oil having differing fluidity levels. For winter blending purposes, the distributor assumes a threshold fluidity level high enough so that all suppliers will supply only product which freeze or form solid wax particles below or at this level. While some product will be at this level, most will be below it, the latter resulting in wastage of No. 1 fuel.

Although the actual fluidity level is known at the refinery, this information becomes lost during distribution, thus necessitating the above-described assumed threshold fluidity value. At the refinery level, the actual fluidity value is obtained by a procedure based on the ASTM D-2386 Freeze Point Method or ASTM D-2500 Cloud Point Method or ASTM D-3117 Wax Appearance Point Method, each of which is a laboratory method for determining the point at which wax crystals in the diesel fuel melt or appear. Determination of freeze point, cloud point or wax appearance point at the refinery level requires cumbersome equipment and a trained technician who must constantly monitor the fuel sample to ascertain visually when melting or wax crystal formation occurs. Thus, these methods are highly subjective and yield non-standard results. Additionally, the cumbersome equipment makes them inconvenient for field use.

Using the conventional methods, during winter months 10-60% kerosine/No. 1 fuel oil is typically blended with No. 2 fuel oil to meet diesel fuel fluidity requirements. The percentage of No. 1 fuel (kerosine) added is dictated by monthly winter blending guidelines specific for each terminal and is based on historical weather data and an assumed fluidity level, as described above, of the base No. 2 fuel oil. The use of an inexact, assumed No. 2 fuel fluidity point frequently leads to overblending in some instances, resulting in No. 1 fuel wastage, and underblending in others, resulting in fuel line, filter and screen clogging.

No fuel blending process or apparatus has heretofore provided on-site precise, tailored diesel fuel blending for optimizing the blend ratio of the component fuels forming the ultimate fuel mixture in order to obtain a fuel mixture which will not freeze or form solid wax particles above a predetermined temperature.

Accordingly, it is an object of the present invention to provide a tailored fuel blending process and apparatus to fulfill the above-described needs heretofore unmet by prior art systems.

It is also an object of the present invention to provide a precise, tailored fuel blending process and apparatus, whereby reliance on assumed fluidity levels of a No. 2 fuel oil component can be avoided by an on-site actual determination of the cloud point level of the No. 2 fuel oil component.

It is also an object of the present invention to provide a tailored fuel blending process and apparatus, whereby substantial savings of required No. 1 fuel oil can be obtained, and whereby more No. 1 fuel oil can be made available for upgrading to, e.g., jet fuel.

It is yet another object of the present invention to provide a tailored fuel blending process and apparatus, whereby a high density diesel fuel blend with higher BTU content and better fuel economy is provided.

It is still another object of the present invention to provide a reliable, automatic tailored fuel blending process and apparatus.

SUMMARY OF THE INVENTION

According to the present invention, a process is provided for blending a fuel which includes a No. 2 fuel oil component and a No. 1 fuel oil component, with the No. 1 fuel oil component providing a fuel mixture which will not form solid particles above a predetermined temperature. The process includes lowering a temperature of a sample of the No. 2 fuel oil component, detecting at least a predetermined rate of change in viscosity of the No. 2 fuel oil component sample or detecting a predetermined level of viscosity of the sample, measuring a temperature of the No. 2 fuel oil component sample when the aforesaid rate of change in viscosity or predetermined viscosity level is detected, determining a percentage amount of the No. 1 fuel oil component to be mixed with the No. 2 fuel oil component based on the temperature measured as above to obtain a fuel mixture which will not form solid particles above a predetermined temperature, and finally blending the No. 1 and No. 2 fuel oil components in accordance with the percentage amount determined as aforesaid. The fuel mixture can be a diesel fuel mixture and the No. 1 fuel oil can be kerosine. The predetermined rate of change in viscosity or the predetermined viscosity level can be detected by placing the No. 2 fuel oil component sample in an annular sample chamber formed between a rotatable cylinder and an inner wall of a tube in which the rotatable cylinder is disposed, rotating the cylinder and measuring the change in viscosity or the absolute viscosity of the No. 2 fuel oil component sample in the annular sample chamber. The process can further include obtaining a temperature measurement indicating the temperature of the No. 2 fuel oil component sample while the sample is being cooled to successively lower temperatures, displaying this measured temperature on a display device and locking this displayed temperature on the display device upon detection of an aforesaid predetermined rate of change in viscosity or upon detection of the predetermined viscosity level. The process can also include raising the temperature of the No. 2 fuel oil component sample to an ambient temperature upon a detection of a predetermined rate of change or a predetermined viscosity, as above.

Also according to the present invention, an apparatus is provided for use in blending a fuel which includes a first fuel oil component and a second fuel oil component, the first fuel oil component providing a fuel mixture which will not form solid particles above a predetermined temperature and the first and second fuel oil components having different fuel oil numbers. Such apparatus includes (a) means for lowering a temperature of a sample of the second fuel oil component from a predetermined temperature to successively lower temperatures, (b) viscometer means for detecting at least a predetermined rate of change in viscosity of the second fuel oil component, and (c) means responsive to a detection of the predetermined rate of change in viscosity by the viscometer means, for generating a temperature signal representing the temperature of the second fuel oil component when the predetermined rate of change in viscosity is detected. The device also includes storage means storing data representing respective percentage amounts of the first fuel oil component to be mixed with the second fuel oil component to obtain a fuel mixture which will not form solid particles above respective given fluidity control temperatures. The storage means receives a first input comprising the temperature signal and a second input comprising data representing a particular given fluidity control temperature. The storage means generates an output responsive to the first and second inputs, for indicating a particular percentage amount of the first fuel oil component to be mixed with the second fuel oil component to obtain a fuel mixture which will not form solid particles above the particular fluidity control temperature. The apparatus can further include means receiving the storage means output for blending the first and second fuel oil components in accordance with the particular percentage amount. The second input to the storage means can include month data. First display means can be provided which receives the output from the storage means and displays the aforesaid particular percentage amount. The blending means can include first and second reservoirs for containing the first and second fuel oil components respectively, and control means for controlling first and second valves on the first and second reservoirs respectively, to deposit fuel oil therefrom in a third reservoir in amounts in accordance with the aforesaid particular percentage amount.

Also according to the present invention, an apparatus is provided for use in blending a fuel as described above, comprising (a) means for lowering a temperature of a sample of the second fuel oil component from a predetermined temperature to successively lower temperatures, (b) means for sensing changes in solid particle concentration of the second fuel oil component and for providing output signals representing these changes, and (c) processing means receiving a first input comprising the aforesaid output signals and a second input comprising a reference signal representing a predetermined change in solid particle concentration, with the processing means comparing the first and second inputs to generate an output signal upon equivalence between the first and second inputs indicating occurrence of the aforesaid predetermined change in solid particle concentration of the second fuel oil component. Means are provided for generating a temperature signal representing the temperature of the second fuel oil component responsive to a signal from the processing means. Additionally, storage means, blending means and first display means as described above can also be included in such apparatus. Further, the second input to the storage means can comprise month data.

BRIEF DESCRIPTION OF THE DRAWINGS

The above and other objects, advantages and features of the present invention will be more fully understood when considered in conjunction with the following figures, of which.

DETAILED DESCRIPTION OF THE INVENTION

Figure 1:
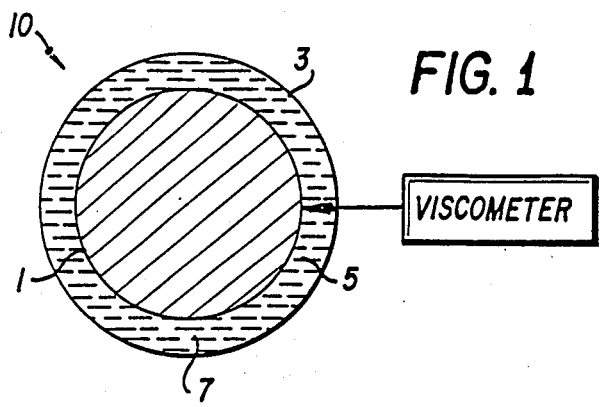
FIG. 1 is a top view of a fuel blending apparatus according to the present invention.
Figure 2:
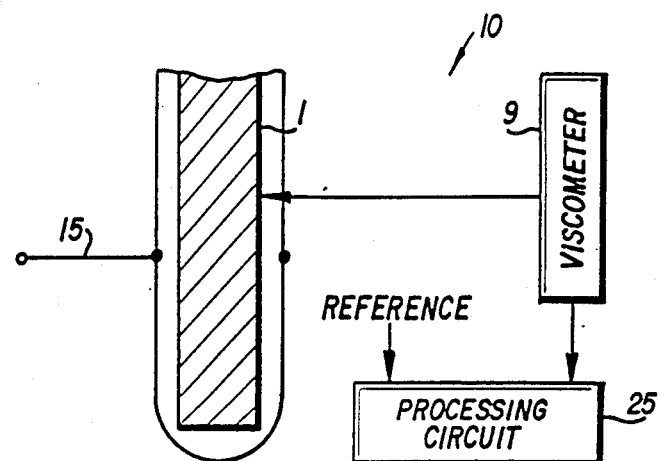
FIG. 2 is a schematic view of a viscometric cloud point tester as shown in FIG. 1.

FIGS. 1 and 2 show an embodiment of a fuel blending apparatus which includes viscometric cloud point tester 10 which senses formation of wax crystals, or other solid particles, in a No. 2 fuel oil component sample from detection of at least a predetermined rate of change in viscosity or from detection of a predetermined absolute viscosity level. Tester 10 includes a sample chamber having a rotatable cylinder 1 disposed inside a tube 3 which may be, e.g., a disposable test tube, such that an annular space 5 is formed between cylinder 1 and the inner wall of tube 3. It should be noted that the term "solid" refers to particles which would tend to interfere with use of the fuel for its intended purpose. Thus, "solid" also encompasses semi-solid, e.g., viscous materials.

A No. 2 fuel oil component sample 7 to be tested is placed in annular space 5, and viscometer 9 rotates cylinder 1 and electronically measures the mechanical resistance to rotation of the fuel oil sample within annular space 5. A standard Brookfield viscometer can be used to preferably rotate cylinder 1 at a constant rate, to measure a change in viscosity. Alternatively, viscometer 9 can be adapted to measure absolute viscosity. Tube 3 is held in position relative to viscometer 9 via a mounting bracket such that tube 3 can be readily replaced by disconnecting the mounting bracket from the viscometer. Viscometer 9 can be moved vertically to position the sample chamber above refrigerated bath 13, as shown in FIG. 2, or to lower the sample chamber into bath 13.

An electronic thermometer 17 extends into bath 13 to measure continuously the temperature of the bath or the sample as the temperature is being lowered. It should be noted that the bath temperature generally will be slightly below that of the sample during the cooling cycle and slightly above during the heating cycle. The measured bath or sample temperature is displayed on display means 19, which preferably is a digital display device. Heater/cooler unit 21 heats or cools the sample within the chamber as desired. Unit 21 can be a solid state electronic thermo-electric cooler or refrigerator system capable of cooling down to the lowest temperature within the required practical range necessary for present purposes, e.g., −25° F., although, of course, such devices are capable of cooling to even lower temperatures. Control circuit 23 initiates a test cycle by switching heater/cooler unit 21 to a cooling mode to cool the sample until the wax formation point is reached. At this wax formation point, the rate of viscosity increase changes, as shown by the various points A on the curves shown in FIG. 3. Viscometer 9 provides an output to signal processing circuit 35, the value of which represents either the absolute viscosity of the sample within the sample chamber or the rate of change thereof.

Processing circuit 25 receives and processes this signal to determine the rate of change of viscosity or alternatively the absolute viscosity by comparing it to a predetermined reference signal to thereby detect at least a predetermined rate of change of viscosity or at least a predetermined absolute viscosity level. The reference signal is, e.g., a voltage signal which is calibrated to provide the required predetermined comparison level. When the predetermined viscosity change occurs or the predetermined absolute viscosity level is reached, an output of processing circuit 25 signals temperature display 19 to set the digital temperature display in the hold mode, whereby it holds the last measured temperature and also directs control circuit 23 to cause heater/cooler unit 21 to switch to the heating mode. Heater/cooler 21 then heats bath 13 until a standby bath temperature of, e.g., 20° F. is reached. At this point, heater/cooler 21 is turned off and the viscometric fluidity testing unit 10 goes into a standby mode until the next test cycle is initiated. Since a change in physical property is detected, i.e., viscosity, color is not a limiting factor with respect to operation of the fluidity tester 10. An advantage of the above is that filtering of water and impurities is not necessary because the above viscosity measurements are not significantly affected by water or impurities.

It should be noted that while hydrocarbon fuel oils form solid wax particles at low temperatures, the present invention is equally applicable to blending of other fuels where it is necessary to determine with precision the temperature at which freezing or formation of interfering solid particles, which might be other than or in addition to wax particles, occurs.

Figure 3:
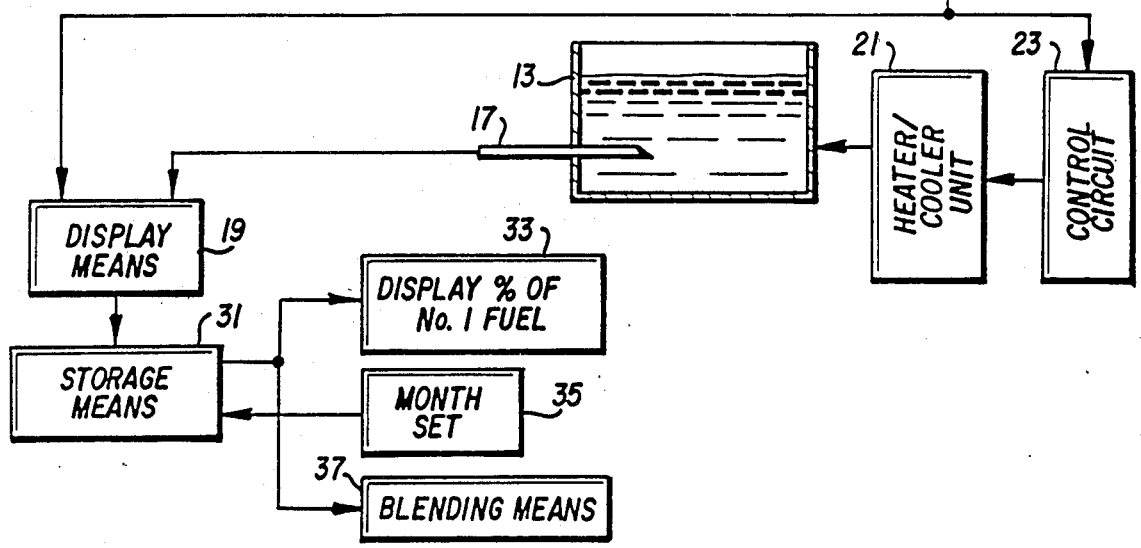
FIG. 3 is a graph illustrating the relationship between temperature and viscosity of fuel oil samples.
Figure 3:
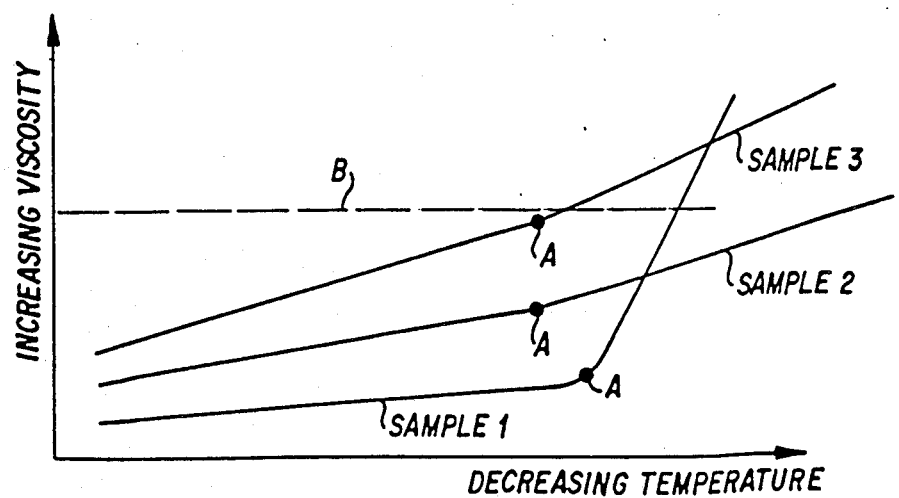

FIG. 3 is a graph which shows curves representing the viscosity of various No. 2 fuel oil component samples as a function of temperature. As noted above, each point A represents the detection point at which a change in the rate of viscosity increase occurs, indicating wax formation. At a viscosity level, denoted by reference line B, solid particles have formed in each sample.

The present invention includes a novel process for blending a fuel, e.g., a diesel fuel, which includes a No. 2 fuel oil component and a No. 1 fuel oil component, with the No. 1 fuel oil component being added to provide a fuel mixture which will not freeze above a predetermined temperature. The No. 1 fuel oil component for diesel fuels can be kerosine. The process includes lowering a temperature of a sample of the No. 2 fuel oil component from a predetermined temperature, e.g., ambient temperature, or any other temperature which is above the fluidity point temperature of the sample, to successively lower temperatures, and detecting at least a predetermined rate of change in viscosity of the No. 2 fuel oil component sample or by detecting a predetermined level of viscosity of the sample. This is done as the temperature of the No. 2 fuel oil component sample is lowered to the aforesaid successively lower temperatures. The temperature of the No. 2 fuel oil component sample or bath is measured at the point when a rate of change of viscosity at least equal to the predetermined rate of change or the predetermined viscosity level is detected. The process includes determining a percentage amount of the No. 1 fuel oil component to be mixed with the No. 2 fuel oil component based on the temperature measured as above, to obtain a fuel mixture which will not freeze or form solid particles above a predetermined temperature.

As used herein, the term No. 1 fuel is intended to be a generic term which includes kerosine and No. 1 heating oil; i.e., the latter are specific types of No. 1 fuel oil. Similarly, the generic term No. 2 fuel oil encompasses No. 2 heating oils.

The percentage of No. 1 fuel oil component which must be added can be determined by a look-up table, as shown in Tables 1 and 2 below. As illustrated in FIG. 2, Tables 1 and 2 can conveniently be stored in a storage means 31, such as a ROM, which stores data indicating the percentage of No. 1 fuel to be added versus the measured wax formation temperature. This data will, of course, vary depending on the geographic area and month in which the fuel is to be used. Table 1 may be, for example, for one particular area for the months as shown, while Table 2 may be for another area for months as shown. The fluidity control temperature in these Tables can be based on freeze point, cloud point or wax appearance point.

TABLE 1

| Typical Diesel Fuel Fluidity Blending Table | | | | | |
| --- | --- | --- | --- | --- | --- |
| | NOV | DEC | JAN | FEB | MAR |
| Fluidity Control Temperature, °F. | +20 | +5 | 0 | 0 | +10 |
| Measured Cloud Point Temperature, °F. | % No. 1 Fuel to be Added | | | | |
| +20 | 0 | 60 | 70 | 70 | 45 |
| 19 | 0 | 55 | 65 | 65 | 40 |
| 18 | 0 | 55 | 65 | 65 | 35 |
| 17 | 0 | 50 | 65 | 65 | 35 |
| 16 | 0 | 45 | 60 | 60 | 30 |
| 15 | 0 | 45 | 60 | 60 | 25 |
| 14 | 0 | 40 | 55 | 55 | 20 |
| 13 | 0 | 35 | 55 | 55 | 15 |
| 12 | 0 | 35 | 50 | 50 | 10 |
| 11 | 0 | 30 | 45 | 45 | 5 |
| 10 | 0 | 25 | 45 | 45 | 0 |
| 9 | 0 | 20 | 40 | 40 | 0 |
| 8 | 0 | 15 | 35 | 35 | 0 |
| 7 | 0 | 10 | 35 | 35 | 0 |
| 6 | 0 | 5 | 30 | 30 | 0 |
| 5 | 0 | 0 | 25 | 25 | 0 |
| 4 | 0 | 0 | 20 | 20 | 0 |
| 3 | 0 | 0 | 15 | 15 | 0 |
| 2 | 0 | 0 | 10 | 10 | 0 |
| 1 | 0 | 0 | 5 | 5 | 0 |
| 0 | 0 | 0 | 0 | 0 | 0 |

TABLE 2

| Typical Diesel Fuel Fluidity Blending Table | | | | | |
| --- | --- | --- | --- | --- | --- |
| | NOV | DEC | JAN | FEB | MAR |
| Fluidity Control Temperature, °F. | +20 | +10 | 0 | +5 | +20 |
| Measured Cloud Point | | | | | |

TABLE 2-continued

Typical Diesel Fuel Fluidity Blending Table

| Temperature, °F. | NOV | DEC | JAN | FEB | MAR |
|---|---|---|---|---|---|
| | \% No. 1 Fuel to be Added | | | | |
| +20 | 0 | 45 | 70 | 60 | 0 |
| 19 | 0 | 40 | 65 | 55 | 0 |
| 18 | 0 | 35 | 65 | 55 | 0 |
| 17 | 0 | 30 | 65 | 50 | 0 |
| 16 | 0 | 30 | 60 | 45 | 0 |
| 15 | 0 | 25 | 60 | 45 | 0 |
| 14 | 0 | 20 | 55 | 40 | 0 |
| 13 | 0 | 15 | 55 | 35 | 0 |
| 12 | 0 | 10 | 50 | 35 | 0 |
| 11 | 0 | 5 | 45 | 30 | 0 |
| 10 | 0 | 0 | 45 | 25 | 0 |
| 9 | 0 | 0 | 40 | 20 | 0 |
| 8 | 0 | 0 | 35 | 15 | 0 |
| 7 | 0 | 0 | 35 | 10 | 0 |
| 6 | 0 | 0 | 30 | 5 | 0 |
| 5 | 0 | 0 | 25 | 0 | 0 |
| 4 | 0 | 0 | 20 | 0 | 0 |
| 3 | 0 | 0 | 15 | 0 | 0 |
| 2 | 0 | 0 | 10 | 0 | 0 |
| 1 | 0 | 0 | 5 | 0 | 0 |
| 0 | 0 | 0 | 0 | 0 | 0 |

In the case, where, e.g., storage means 31 is used to store such data, means 31 receives as one input the temperature output from display means 19 and, as another input, preset data representing a month, producing, from these, data representing the percentage of the No. 1 fuel component to be used in the final mixture. This percentage value could be displayed on a display 33, if desired.

Once the percentage amount has been determined as above, the No. 1 and No. 2 fuel oil components are blended in accordance with this determined percentage amount. The temperature of the No. 2 fuel oil component sample or bath is measured while the No. 2 fuel oil component sample is subject to environmental conditions prevailing at a location within a predetermined geographic region in which the fuel mixture is to be used.

Figure 4:
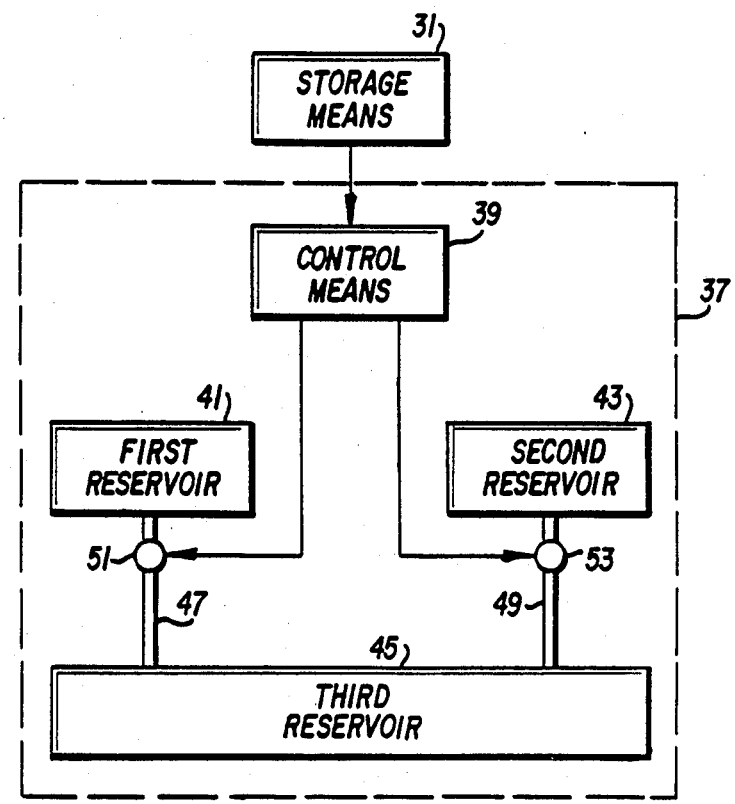
FIG. 4 illustrates additional aspects of the fuel blending apparatus of FIGS. 1 and 2.

Additionally, an output representing the necessary blend percentages of the fuel components can be provided from storage device 31 to blending means 37 which automatically blends the fuel components in accordance with these percentages. As shown in FIG. 4, blending means 37 can comprise a control means 39 which receives a percentage indicating output from storage device 31. Responsive to this output from storage device 31, control means 39 provides control signal outputs to first and second reservoirs 41 and 43 which contain No. 1 fuel oil and No. 2 fuel oil, respectively. These control signals operate valve means 51 and 53 on output lines 47 and 49 associated with reservoirs 41 and 43, respectively. Valve means 51 and 53 open in varying degrees in response to the aforesaid control signals to deposit fuel oil from reservoirs 41 and 43 in third reservoir 45 in amounts in accordance with the indicated percentage amounts required to obtain the desired fuel blend.

The predetermined rate of change in viscosity or the predetermined absolute viscosity level can be detected by placing the No. 2 fuel oil component sample in an annular chamber or annular space 5 (constituting a refrigerated bath), as described above, which is formed between a rotatable cylinder and an inner wall of a tube in which the rotatable cylinder is disposed, rotating the cylinder and measuring a rate of change in viscosity of, a magnitude of change in viscosity, or the absolute viscosity of, the No. 2 fuel oil component sample in the annular sample chamber. The process can further comprise measuring a temperature of the No. 2 fuel oil component sample or bath while the No. 2 fuel oil component sample is being cooled to the aforesaid successively lower temperatures, displaying the measured temperature on a display device and locking the displayed temperature on the display device upon a detection of at least a predetermined rate of change in viscosity or upon a detection of a predetermined viscosity level. The measured temperature can then be used, as noted above, to determine a percentage of the No. 1 fuel oil component required in the final fuel mix. The process can also include raising the temperature of the No. 2 fuel oil component sample to an ambient temperature upon a detection of at least a predetermined rate of change or a predetermined viscosity level. The sample is preferably raised to ambient temperature, as opposed to evacuating the chamber after the test is completed, in order to eliminate the thermal history of the sample. Alternatively, each sample can be used once then discarded. For example, if the sample temperature is raised merely to, e.g. 20° F., the thermal condition of the sample is still affected by the previous cooling.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. A process for blending a fuel which includes a first fuel component and a second fuel component, said first fuel component providing a fuel mixture which will not form solid particles above a predetermined temperature, said process comprising the steps of:
    (a) lowering a temperature of a second fuel component sample of said second fuel component from a predetermined temperature to successively lower temperatures;
    (b) detecting a rate of change in viscosity of said second fuel component sample at least as great as a predetermined rate of change thereof, said predetermined rate of change corresponding to a rate indicating initial substantial formation of solid particles in said second fuel component;
    (c) obtaining a temperature measurement indicating a temperature of said second fuel component sample when at least said predetermined rate of change in viscosity is detected;
    (d) determining a percentage amount of said first fuel component to be mixed with said second fuel component based on said temperature determined in step (c) to obtain a fuel mixture which will not form solid particles above a predetermined temperature; and
    (e) blending said first and second fuel components in accordance with said percentage amount determined in step (d).

2. The process as recited in claim 1 further comprising placing said second fuel component sample into a refrigerated bath, lowering said temperature of said second fuel component sample by lowering a temperature of said refrigerated bath and obtaining said temperature measurement indicating a temperature of said second fuel component sample by measuring a temperature of said refrigerated bath.

3. The process as recited in claim 1, wherein said temperature measurement indicating a temperature of said second fuel component sample is obtened by measuring a temperature of said second fuel component sample.

4. The process as recited in claim 1, wherein said first fuel oil component is a No. 1 fuel oil component and said second fuel oil component is a No. 2 fuel oil component, said first and second fuel oil components having different fuel oil numbers.

5. The process as recited in claim 4, wherein said predetermined rate of change in viscosity is detected by placing said No. 2 fuel oil component sample in an annular sample chamber formed between a rotatable cylinder and an inner wall of a tube in which said cylinder is disposed, rotating said cylinder and measuring a rate of change in viscosity of said No. 2 fuel oil component sample within said annular sample chamber.

6. The process as recited in claim 4, further comprising measuring a temperature of said No. 2 fuel oil component sample while said No. 2 fuel oil component sample is being cooled to said successively lower temperatures, displaying said measured temperature on a display device and locking said displayed temperature on said display device in response to a detection of at least said predetermined rate of change in viscosity.

7. The process as recited in claim 6, further comprising raising said temperature of said No. 2 fuel oil component sample to an ambient temperature in response to a detection of at least said predetermined rate of change in viscosity.

8. The process as recited in claim 4, wherein said fuel mixture is a diesel fuel mixture and said No. 1 fuel oil component is kerosine.

9. A process for blending a fuel which includes a first fuel component and a second fuel component, said first fuel component providing a fuel mixture which will not form solid particles above a predetermined temperature, said process comprising the steps of:
(a) lowering a temperature of a second fuel component sample of said second fuel component from a predetermined temperature to successively lower temperatures;
(b) detecting a level of viscosity of said second fuel component sample at least as great as a predetermined level thereof, said predetermined level corresponding to a level indicating initial substantial formation of solid particles in said second fuel component;
(c) obtaining a temperature measurement indicating a temperature of said second fuel component sample when at least said predetermined level of viscosity is detected;
(d) determining a percentage amount of said first fuel component to be mixed with said second fuel component based on said temperature determined in step (c) to obtain a fuel mixture which will not form solid particles above a predetermined temperature; and
(e) blending said first and second fuel components in accordance with said percentage amount determined in step (d).

10. The process as recited in claim 9, further comprising placing said second fuel component sample into a refrigerated bath, lowering said temperature of said second fuel component sample by lowering a temperature of said refrigerated bath and obtaining said temperature measurement indicating a temperature of said second fuel component sample by measuring a temperature of said refrigerated bath.

11. The process as recited in claim 9, wherein said temperature measurement indicating a temperature of said second fuel component sample is obtained by measuring a temperature of said second fuel component sample.

12. The process as recited in claim 9, wherein said first fuel oil component is a No. 1 fuel oil component and said second fuel oil component is a No. 2 fuel oil component, said first and second fuel oil components having different fuel oil numbers.

13. The process as recited in claim 12, wherein said predetermined level of viscosity is detected by placing said No. 2 fuel oil component sample in an annular sample chamber formed between a rotatable cylinder and an inner wall of a tube in which said cylinder is disposed, rotating said cylinder and measuring a viscosity level of said No. 2 fuel oil component sample within said annular sample chamber.

14. The process as recited in claim 12, further comprising measuring a temperature of said No. 2 fuel oil component sample while said No. 2 fuel oil component sample is beng cooled to said successively lower temperatures, displaying said measured temperature on a display device and locking said displayed temperature on said display device in response to a detection of at least said predetermined level of viscosity.

15. The process as recitedin claim 14, further comprising raising said temperature of said No. 2 fuel oil component sample to an ambient temperature in response to a detection of at least said predetermined level of viscosity.

16. The process as recited in claim 12, wherein said fuel mixture is a diesel fuel mixture and said No. 1 fuel oil component is kerosine.

17. A process for blending a fuel which includes a first fuel component and a second fuel component, said first fuel component providing a fuel mixture which will not form solid particles above a predetermined temperature, said process comprising the steps of:
(a) lowering a temperature of a second fuel component sample of said second fuel component from a predetermined temperature to successively lower temperatures;
(b) sensing changes in solid particle concentration of said second fuel component sample;
(c) providing output signals representing said changes;
(d) comparing said output signals with a reference signal representing a predetermined change in said solid particle concentration to detect said predetermined change in solid particle concentration of said second fuel component sample;
(e) obtaining a temperature measurement indicating a temperature of said second fuel component sample when said predetermined change is detected;
(f) determining a percentage amount of said first fuel component to be mixed with said second fuel component based on said temperature determined in step (e) to obtain a fuel mixture which will not form solid particles above a predetermined temperature; and (g) blending said first and second fuel components in accordance with said percentage amount determined in step (f).

18. The process as recited in claim 17, further comprising placing said second fuel component sample into a refrigerated bath, lowering said temperature of said second fuel component sample by lowering a temperature of said refrigerated bath and obtaining said temperature measurement indicating a temperature of said second fuel component sample by measuring a temperature of said refrigerated bath.

19. The process as recited in claim 17, wherein said temperature measurement indicating a temperature of said second fuel component sample is obtained by measuring a temperature of said second fuel component sample.

20. The process as recited in claim 17, wherein said first fuel component is a No. 1 fuel oil component and said second fuel component is a No. 2 fuel oil component, said first and second fuel oil components having different fuel oil numbers.

21. An apparatus for use in blending a fuel which includes a first fuel component and a second fuel component, said first fuel component providing a fuel mixture which will not form solid particles above a predetermined temperature, said apparatus comprising:
(a) means for lowering a temperature of a second fuel component sample of said second fuel component from a predetermined temperature to successively lower temperatures;
(b) viscometer means for detecting a rate of change in viscosity of said second fuel component sample at least as great as a predetermined rate of change thereof, said predetermined rate of change corresponding to a rate indicating initial substantial formation of solid particles in said second fuel component;
(c) means responsive to a detection of at least said predetermined rate of change in viscosity by said viscometer means, for generating a temperature signal indicating the temperature of said second fuel component sample when at least said predetermined rate of change in viscosity is detected; and
(d) storage means storing data representing respective percentage amounts of said first fuel component to be mixed with said second fuel component to obtain a fuel mixture which will not form solid particles above respective given fluidity control temperatures, said storage means receiving a first input comprising said temperature signal and a second input comprising data representing a particular said given fluidity control temperature, said storage means generating an output responsive to said first and second inputs, for indicating a particular percentage amount of said first fuel component to be mixed with said second fuel component to obtain a fuel mixture which will not form solid particles above said particular fluidity control temperature.

22. The apparatus as recited in claim 21, wherein said first fuel component is a No. 1 fuel oil component and said second fuel component is a No. 2 fuel oil component, said first and second fuel oil components having different fuel oil numbers.

23. The apparatus as recited in claim 21, further comprising means receiving said storage means output for blending said first and second fuel oil components in accordance with said particular percentage amount.

24. The apparatus as in claim 21, wherein said second input comprises month data.

25. The apparatus as recited in claim 21, further comprising first display means receiving said output from said storage means for displaying said particular percentage amount.

26. The apparatus as recited in claim 21, wherein said blending means comprises a first reservoir for containing said first fuel oil component, a second reservoir for containing said second fuel oil component, and control means for controlling a first valve on said first reservoir and a second valve on said second reservoir to deposit fuel oil therefrom in a third reservoir in amounts in accordance with said particular percentage amount.

27. An apparatus for use in blending a fuel which includes a first fuel component and a second fuel component, said first fuel component providing a fuel mixture which will not form solid particles above a predetermined temperature, said apparatus comprising:
(a) means for lowering a temperature of a second fuel component sample of said second fuel component from a predetermined temperature to successively lower temperatures;
(b) means for sensing changes in solid particle concentration of said second fuel component sample and for providing output signals representing said changes;
(c) processing means receiving a first input comprising said output signals and a second input comprising a reference signal representing a predetermined change in said solid particle concentration, said processing means comparing said first and second inputs to generate an output signal when said first input is at least as great as said second input indicating occurrence of said predetermined change in solid particle concentration of said second fuel component sample;
(d) means for generating a temperature signal representing a temperature of said second fuel component sample responsive to a said signal from said processing means; and
(e) storage means storing data representing respective percentage amounts of said first fuel component to be mixed with said second fuel component to obtain a fuel mixture which will not form solid particles above respective given fluidity control temperatures, said storage means receiving a first input comprising said temperature signal and a second input comprising data representing a particular said given fluidity control temperature, said storage means generating an output responsive to said first and second inputs, for indicating a particular percentage amount of said first fuel component to be mixed with said second fuel component to obtain a fuel mixture which will not form solid particles above said particular fluidity control temperature.

28. The apparatus as recited in claim 27, further comprising means receiving said storage means output for blending said first and second fuel oil components in accordance with said percentage amount.

29. The apparatus as recited in claim 27, wherein said first fuel component is a No. 1 fuel oil component and said second fuel component is a No. 2 fuel oil component, said first and second fuel oil components having different fuel oil numbers.

30. An apparatus for use in blending a fuel which includes a first fuel component and a second fuel component, said first fuel component providing a fuel mixture which will not form solid particles above a predetermined temperature, said apparatus comprising:

(a) means for lowering a temperature of a second fuel component sample of said second fuel component from a predetermined temperature to successively lower temperatures;

(b) means for sensing changes in solid particle concentration of said second fuel component sample and for providing output signals representing said changes;

(c) processing means receiving a first input comprising said output signals and a second input comprising a reference signal representing a predetermined change in said solid particle concentration, said processing means comparing said first and second inputs to generate an output signal when said first input is at least as great as said second input indicating occurrence of said predetermined change in solid particle concentration of said second fuel component sample;

(d) means for generating a temperature signal representing a temperature of said second second fuel component responsive to a said signal from said processing means; and (e) percentage indicating means receiving a first input comprising said temperature signal and a second input comprising data representing a particular fluidity control temperature, said percentage indicating means generating an output responsive to said first and second inputs, for indicating a particular percentage amount of said first fuel component to be mixed with said second fluid component to obtain a fuel mixture which will not form solid particles above said particular fluidity control temperature.

* * * * *

UNITED STATES PATENT AND TRADEMARK OFFICE
CERTIFICATE OF CORRECTION

PATENT NO. : 4,677,567

DATED : June 30, 1987

INVENTOR(S) : Richard W. Grosser et al

It is certified that error appears in the above-identified patent and that said Letters Patent is hereby corrected as shown below:

Col. 5, line 12, "35" should be --25--
Col. 11, line 65, "recitedin" should be --recited in--

Signed and Sealed this

Seventeenth Day of November, 1987

Attest:

DONALD J. QUIGG

*Attesting Officer*  *Commissioner of Patents and Trademarks*